Aug. 23, 1960 W. P. PEKLAY ET AL 2,949,687
EXCAVATING TOOTH
Filed July 15, 1957
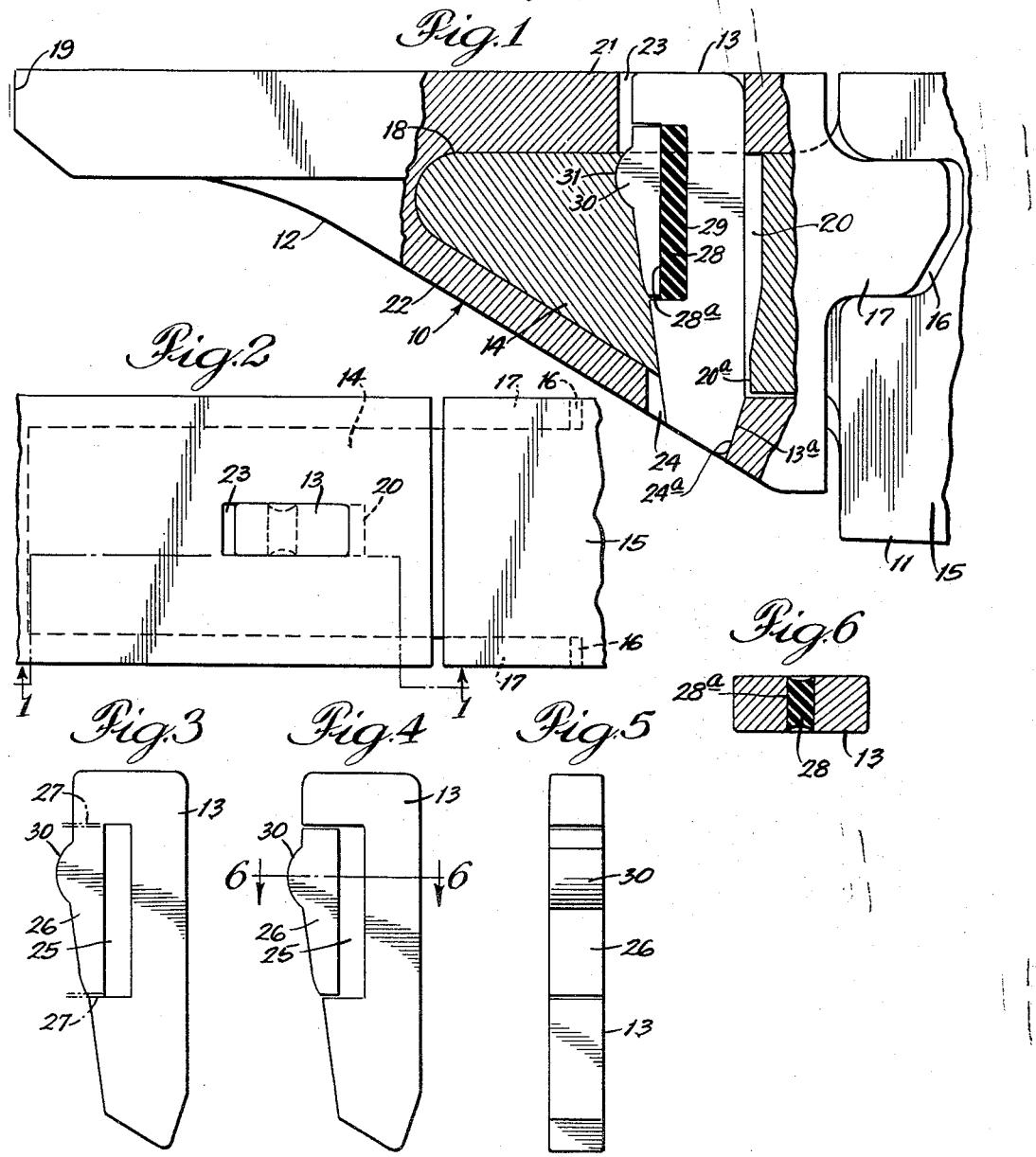
INVENTORS:
William P. Peklay
and Thomas P. Kirby,
BY Dawson, Tilton, Fallon & Lungmus,
ATTORNEYS.

//  
United States Patent Office 2,949,687  
Patented Aug. 23, 1960

2,949,687
EXCAVATING TOOTH

William P. Peklay, Vancouver, Wash., and Thomas P. Kirby, Danville, Ill., assignors to Electric Steel Foundry Company, Portland, Oreg., a corporation of Oregon Filed July 15, 1957, Ser. No. 672,090

4 Claims. (Cl. 37—142)

This invention relates to an improvement in an excavating tooth, and more particularly to an improved structure for maintaining a removable tooth point in place on an adapter.

The excavating tooth with which this invention is concerned is used principally in excavating machinery. In many instances, the forward or biting edge of a shovel or dipper is provided with a plurality of teeth to facilitate earth removal. When such teeth are provided, as is the usual case, tremendous stresses are applied to them tending to rupture or at least dislocate them from their mounting. It is also to be appreciated that because of the environment in which these teeth are employed that they have to be replaced from time to time for re-sharpening. Thus, it is extremely desirable that the means for locking the replaceable portion of a tooth, i.e., the point, be as strong and durable as possible. Consonant with these properties, the locking means should also be simply constructed in order to promote maximum utilization of the teeth with which they are associated.

All of these purposes have not been adequately served by the locking means employed in the past. To secure a hollow wedge-shaped point on a solid wedge-shaped adapter or tongue extending from the dipper or shovel, keys or rod-like members of various constructions have been utilized that are mounted in passageways in the adapter portion of a tooth and extend through openings in the point which can be brought in register with the adapter passageway. The more secure the union between the point and the adapter was made, as by employing a slightly oversized key, the more difficult the replacement of the point became. It is to be appreciated that ready replacement of points is oftentimes of equal importance as the secureness of the locking of the points to the adapter. Should a point be difficult of replacement, it might necessitate extensive and expensive "down time" of a large and irreplaceable machine.

The modifications of the simple key or pin that have been proposed to insure secure locking yet permit ready removal have suffered from a number of disadvantages. Especially vexatious among the disadvantages was the number of component parts necessary to provide a modified locking structure capable of secure locking but ready removal. Where, for example, locking was achieved through the cooperation of a block of resilient compressible material it was not unusual for a replacement to be held up because various of the component parts could not be quickly obtained. In the field where replacements are generally made, and it is to be appreciated that excavating machines employing replaceable excavating teeth are often located quite remote from sources of supply, it was not unusual for the machine user to be lacking one of the component parts necessary for providing a new locking structure.

Additionally, the employment of more intricate locking means than a simple key or pin involved additional work in fabrication of the adapter and/or point which oftentimes resulted in an overall weakening of the composite excavating tooth structure. Where, for example, a compressible block was employed to coact with a pin to maintain it in locking relation between an adapter and a point, provision had to be made, usually in the adapter, for receipt of the plug. If a cavity were provided for this purpose, there would be an overall weakening of the combined structure, oftentimes at a point where strength should be maximized.

Still further, in the modifications of simple pin or key structures employed for secure locking and ready removal, the weakest portion of the modified structure was subjected to some of the strongest stresses. In many instances, for example, the compressible block utilized to maintain the pin or key in locking relation was subjected to shear rather than simple compressive forces for which it was designed. The premature failure of such an important operative element oftentimes resulted in unexpected and costly delays in the field. Thus, the relatively simple locking structure assumes an importance substantially out of proportion to its size and cost when the consequential effects of its failure are considered.

It is therefore an object of this invention to provide an improved excavating tooth. Another object is to provide an improved locking structure for maintaining together a replaceable point and adapter portion of an excavating tooth structure. Still another object is to provide a novel method for fabricating an improved locking means for an excavating tooth. Yet another object is to provide a locking structure or an excavating tooth that avoids the disadvantages and solves the problems set forth above. Other objects and advantages of this invention will be seen as this specification proceeds.

This invention will be described, in an illustrated embodiment, in conjunction with the accompanying drawing, in which—

Fig. 1 is a fragmentary elevational view of an excavating tooth partially broken away (as along the line 1—1 of Fig. 2) to show locking means constructed in accordance with teachings of this invention in an operative environment; Fig. 2 is a top plan view in fragmentary form and reduced scale of the excavating tooth structure shown in Fig. 1; Fig. 3 is an elevational view of an improved locking pin embodying teachings of this invention and shown in one stage of its manufacture; Fig. 4 is a view similar to Fig. 3 but showing the locking pin in another stage of manufacture; Fig. 5 is an end elevational view of the locking pin structure shown in Fig. 4; and Fig. 6 is a cross-sectional view taken along the line 6—6 of Fig. 4.

In the illustration given, the numeral 10 designates generally an excavating tooth which is intended to be secured to excavating machinery such as to the biting edge of a dipper, bucket, scraper, or shovel. Tooth 10, in the illustration given, includes three coacting parts: an adapter 11 shown in fragmentary form and adapted to be connected directly to the shovel, etc.; a point 12 mounted on adapter 11; and a locking pin 13 maintaining point 12 in place on adapter 11.

For the purpose of receiving point 12, adapter 11 is provided with a wedge-shaped tongue 14 as seen in Figs. 1 and 2. Wedge-shaped tongue 14 of adapter 11 has a base of smaller dimension than the shank portion 15 of adapter 11. The shank 15 of adapter 11 is provided with a pair of longitudinally disposed recesses 16 along the horizontal sides thereof.

Point 12 is equipped with a pair of longitudinally or rearwardly extending tongues 17 which are received in recesses 16 when point 12 is mounted on adapter 11. Point 12 is generally wedge-shaped in construction and is provided with a hollow wedge-shaped chamber 18 extending inwardly partway from the base thereof and which accommodates nose 14 when point 12 is mounted on adapter 11. The forwardmost portion of point 12 is provided with a biting or cutting edge as at 19. Further specificity of description of the point and adapter structure is considered unnecessary since the details thereof may be varied widely by those skilled in the art in the practice of this invention.

The nose portion 14 of adapter 11 is provided with a passageway 20 extending therethrough. Passageway 20, in the illustration given, extends parallel to the wedge or triangular-shaped faces of nose 14. Passageway 20 is restricted at one end as at 20a which also has a rectangular cross-section as has passage 20, which can be appreciated from a consideration of Fig. 2.

The wedge-forming planar faces 21 and 22 of point 10 are provided with aligned rectangular openings 23 and 24. Opening 24 is tapered inwardly as at 24a.

Received within passage 20 of nose 14 and extending through openings 23 and 24 is locking pin 13. Locking pin 13 is provided with a length substantially equal to the outside dimension between planar faces 21 and 22. Inasmuch as planar face 22 is inclined with respect to planar face 21, the end of pin 13 adjacent face 22 is tapered to permit pin 13 to extend flush with face 22.

Pin 13 is provided with a rectangular cross-section so as to reside firmly in passage 20 and openings 23 and 24 free against rotation. The short dimension of the rectangular cross-section of pin 13 is disposed parallel with the base of nose 14. Pin 13 is provided with a second taper 13a adjacent its end received in opening 24. The cooperation of tapers 24a and 13a provide a limit for the insertion of pin 13.

Pin 13 is provided with a cavity or passage 25 intermediate the ends thereof and extending therethrough as can be best seen in Fig. 3. Cavity 25 can be conveniently provided during the casting of pin 13. The portion of pin 13 laterally adjacent of cavity 25 and designated 26 can be conveniently removed as by cutting along dotted lines 27 after casting to form the structure of Fig. 4 wherein cavity 25 now can be likened to a notch. Thereafter a compressible plug of resilient material 28 is mounted within cavity 24. Plug 28 only partially fills cavity 25, providing an outside face 28a which is spaced inwardly of the outer side wall of pin 13 which abuts the wall defining passage 20. Face 28a is also spaced from the inner wall 29 of cavity 25.

After plug 28 has been mounted in place in cavity 25 in the condition shown in Fig. 1, severed portion 26 which can be likened to a facing for plug 28 is thereafter mounted on face 28a of plug 28. Alternatively, it is possible to unite portion 26 to plug 28 before installation of plug 28 in cavity 25. Excellent results have been obtained when portion 26 has been adhesively bounded to plug 28 and plug 28 adhesively bounded to the inner wall 29 of cavity 25. Such can be conveniently achieved where, for example, plug 28 is constructed of rubber.

Portion 26 which, as mentioned above, acts as a facing member for plug 28 is provided with a protuberance 30 which engages a complementary recess 31 in the wall defining passage 20 of nose 14.

When a tooth structure is assembled according to Fig. 1, any tendency of tooth 12 to move outwardly and away from adapter 11 is resisted by the front and rear walls of pin 13. For this purpose, the rectangular construction of pin 13 is eminently suited since the long dimension is disposed in the direction in whch the stress brought about by attempted removal of point 12 is applied. Any tendency for the expulsive removal of pin 13 from its position in passage 20 is resisted by protuberance 30 in cooperation with recess 31. In this connection it is to be appreciated that any vertical force (as seen in Fig. 1) applied to protuberance 30 is translated to the main body of pin 13 rather than to plug 28 so that plug 28 is subjected to only compressive forces and none of shear. Important in this respect are the planar or squared ends of portion 26 which are urged into abutting relation with the end walls of cavity 25 to transmit stresses to the main body of pin 13.

While in the foregoing specification an embodiment of the invention has been set forth in considerable detail for purposes of making an adequate disclosure thereof, it would be apparent to those skilled in the art that numerous changes may be made in those details without departing from the spirit and principles of the invention.

We claim:

1. In an excavating tooth structure, a tooth point on an adapter, aligned vertically-extending openings in said tooth and adapter, a cavity in said adapter communicating with the opening therein, and an elongated metal pin extending through said aligned openings, said pin being provided with a recess in the side wall thereof intermediate the ends thereof and facing said cavity, a metal member in said recess equipped with a cavity-mating protuberance and having ends spaced from the ends of said recess, and a plug of resilient material interposed between said member and said pin in said recess, said pin being longitudinally tapered with the adapter opening contoured on one side thereof to bear against one side of said pin, the openings in said point bearing against the opposite side of said pin, said pin having its narrower cross-section adjacent the bottom end thereof and adjacent said bottom on said opposite side being equipped with an additional tapered portion, said additional tapered portion providing the surface in said pin effectve to bear aganst the bottom portion of said point.

2. The structure of claim 1, in which said recess is a rectangular notch in said pin and said member has planar end walls.

3. In an excavating tooth structure, a wedge-shaped adapter having a vertical passage extending therethrough, a wedge-shaped tooth mounted on said adapter and having openings in opposing walls thereof registerable with said passage, an elongated metal pin substantially filling said passage and openings, the passage in said adapter having a cavity in one of the passage-defining walls and intermediate the ends thereof, the wall of said pin adjacent said cavity being provided with a recess, a metal member in said recess equipped with a cavity-mating protuberance, said member being shorter than the longitudinal dimension of said recess, and a plug of resilient material interposed between said member and said pin in said recess, said pin being downwardly longitudinally tapered and equipped with opposite generally flat faces, one of said faces bearing against said one of the passage-defining walls of said adapter, the other of said pin faces bearing against the inside of said tooth openings, said pin at its lower end being additionally downwardly longitudinally tapered in the face thereof engaging the lower point opening.

4. The structure of claim 3, in which said plug is bonded to said member.

References Cited in the file of this patent

UNITED STATES PATENTS

| | | |
|---|---|---|
| 1,967,148 | Kurlan | July 17, 1934 |
| 2,323,216 | Goldschmidt | June 29, 1943 |
| 2,702,490 | Launder | Feb. 22, 1955 |
| 2,772,492 | Murtaugh | Dec. 4, 1956 |
| 2,846,790 | Davis et al. | Aug. 12, 1958 |
| 2,870,667 | Murtaugh | Jan. 27, 1959 |

FOREIGN PATENTS

| | | |
|---|---|---|
| 502,804 | Great Britain | Mar. 24, 1939 |